United States Patent
Tokuyasu et al.

(10) Patent No.: US 6,659,075 B1
(45) Date of Patent: Dec. 9, 2003

(54) CYLINDER INJECTION ENGINE AND METHOD OF COMBUSTING ENGINE

(75) Inventors: Noboru Tokuyasu, Hitachi (JP); Toshiharu Nogi, Hitachinaka (JP); Yoshihiro Sukegawa, Hitachi (JP); Takuya Shiraishi, Hitachinaka (JP); Yoko Nakayama, Hitachi (JP); Yusuke Kihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/936,573

(22) PCT Filed: Jun. 11, 1999

(86) PCT No.: PCT/JP99/03129

§ 371 (c)(1),
(2), (4) Date: Sep. 14, 2001

(87) PCT Pub. No.: WO00/77359

PCT Pub. Date: Dec. 21, 2000

(51) Int. Cl.$^7$ ................................................. F02B 5/02
(52) U.S. Cl. ...................... 123/301; 123/302; 123/305
(58) Field of Search ...................... 123/298, 301, 123/305, 306, 308, 309

(56) References Cited

U.S. PATENT DOCUMENTS

| | | | |
|---|---|---|---|
| 5,740,777 A | | 4/1998 | Yamamoto et al. |
| 5,775,288 A | | 7/1998 | Suzuki et al. |
| 5,873,344 A | | 2/1999 | Kudou et al. |
| 6,065,444 A | * | 5/2000 | Jingu et al. ................. 123/301 |
| 6,092,743 A | * | 7/2000 | Shibata et al. .......... 239/533.12 |
| 6,095,113 A | * | 8/2000 | Nogi et al. ................... 123/295 |
| 6,269,790 B1 | * | 8/2001 | Yi et al. ..................... 123/295 |
| 6,311,665 B1 | * | 11/2001 | Yasuoka et al. ............. 123/260 |
| 6,334,427 B1 | * | 1/2002 | Nakayama et al. .......... 123/305 |
| 6,390,059 B1 | * | 5/2002 | Shiraishi et al. ............. 123/301 |
| 6,427,659 B2 | * | 8/2002 | Shiraishi et al. ............. 123/301 |
| 6,453,872 B1 | * | 9/2002 | Miyajima et al. ........... 123/298 |
| 2001/0025621 A1 | * | 10/2001 | Shiraishi et al. ............. 123/305 |
| 2002/0005267 A1 | * | 1/2002 | Okamoto et al. ............. 123/305 |
| 2002/0078919 A1 | * | 6/2002 | Yasuoka et al. ............. 123/295 |

FOREIGN PATENT DOCUMENTS

| | | |
|---|---|---|
| EP | 0875672 A2 | 11/1998 |
| JP | 1-267328 | 10/1989 |
| JP | 6-81656 | 3/1994 |
| JP | 7-26963 | 1/1995 |
| JP | 09-14103 | 1/1997 |
| JP | 9-217644 | 8/1997 |
| JP | 9-317505 | 12/1997 |
| JP | 10-8967 | 1/1998 |
| JP | 10-26024 | 1/1998 |
| JP | 10-30441 | 2/1998 |
| JP | 10-54246 | 2/1998 |
| JP | 2748322 | 2/1998 |
| JP | 10-169447 | 6/1998 |
| JP | 10-212965 | 8/1998 |
| JP | 10-274133 | 10/1998 |
| JP | 10-288127 | 10/1998 |
| JP | 10-299537 | 11/1998 |
| JP | 10-339219 | 12/1998 |

(List continued on next page.)

Primary Examiner—Henry C. Yuen
Assistant Examiner—Hai H. Huynh
(74) Attorney, Agent, or Firm—Crowell & Moring LLP

(57) ABSTRACT

A direct injection engine capable of direct injection of fuel into a combustion chamber characterized in that discharge of gas containing hazardous gas component such as HC can be reduced and fuel economy can be improved by stratified charge combustion in the operation range of low to high speeds. Spray fuel from the fuel injector is fed to the ignition plug by tumble air flow generated in the combustion chamber and formed between the fuel injector located on the side of the combustion chamber and the ignition plug installed on the top of the combustion chamber. This engine (a tumble guide direct injection engine) is configured to ensure that fuel reaches the ignition plug at the time of its ignition.

13 Claims, 10 Drawing Sheets

(SPRAY SPECIFICATION)
SPRAY TOP END ANGLE $\gamma = \theta$ - INJECTOR INSTALLATION ANGLE $\alpha$ SPRAY TOP END ANGLE $\gamma = \beta \pm 5°$

FOREIGN PATENT DOCUMENTS

| | | |
|---|---|---|
| JP | 11-62593 | 3/1999 |
| JP | 11-82030 | 3/1999 |
| JP | 11-141338 | 5/1999 |
| JP | 11-182329 | 7/1999 |
| JP | 11-193722 | 7/1999 |
| JP | 11-200866 | 7/1999 |
| JP | 154724 * 6/2000 | ........... F02B/23/10 |
| JP | 201946 * 7/2002 | ........... F02B/23/10 |
| WO | WO 96/36808 | 11/1996 |

* cited by examiner

IGNITION TIMING

※ BTDC:35deg (AT ;1400rpm,Pi320Kpa)
※※ BTDC:30deg (AT ;3200rpm,Pi350Kpa)

(SPRAY SPECIFICATION)

SPRAY TOP END ANGLE $\gamma = \theta$ - INJECTOR INSTALLATION ANGLE $\alpha$ SPRAY TOP END ANGLE $\gamma = \beta \pm 5°$

STRAIGHT SPRAY $L1=L2$
$\theta h=0$

STRAIGHT SPRAY WITH DEVIATED DENSITY $L1>L2$
$\theta h=0$

DEVIATED SPRAY $L1>L2$
$\theta h>0$

CASTING SPRAY

SPRAY DENSITY IS HIGH ON THE IGNITION PLUG SIDE

SPRAY TRANSVERSE CROSS-SECTION

STRAIGHT(OBJECT) SPRAY

SPRAY TRANSVERSE
CROSS-SECTION $\theta P/2 < \theta < \theta$ WALL $\theta P/2 > \theta$ : IGNITION PERIOD SHORT
$\theta$ WALL $< \theta$ : FUEL IS ADHERED ON ENGINE HEAD → HC GREATER

CYLINDER INJECTION ENGINE AND METHOD OF COMBUSTING ENGINE

TECHNICAL FILED

The present invention relates to a direct injection engine, particularly to a direct injection engine wherein fuel is directly injected into the combustion chamber for forming a tumble air flow.

BACKGROUND ART

According to the prior art, a direct injection engine is proposed wherein an injection nozzle of the fuel injector is provided in the combustion chamber of the engine, and fuel is injected for combustion from the fuel injector to the combustion chamber in the latter stage of the compression stroke in a light load/low speed range of the engine (Japanese Application Patent Laid-Open Publication NO. Hei 10-54246).

To put it more specifically, this direct injection engine is designed as follows: A fuel injector is provided on the peripheral area of the combustion chamber where swirl air flow is formed in a light load/low speed range. The distance from the injection nozzle of the fuel injector to the inner surface of the cylinder placed face-to-face with the injection nozzle is made longer than the distance for the arrival of fuel spray by injection during the time from the start of fuel injection to ignition. At the same time, the ignition plug is arranged so that the ignition gap of the ignition plug electrode is located in the fuel spray area injected from the fuel injector. The distance from the injection nozzle of the fuel injector to the ignition gap is made smaller than the distance for arrival of fuel spray.

In this direct injection engine, fuel is injected from the fuel injector into the combustion chamber where the swirl gas flow is formed, in the latter stage of the compression stroke in a light load/low speed range of the engine. As a result, stratified charge combustion is performed. At the time of ignition, spray fuel from the fuel injector does not reach the wall surface of the combustion chamber because of the configuration of the ignition plug, fuel injector and positional relationship between fuel spray angle and spray arrival distance. However, spray fuel is present around the ignition cap of the ignition plug. This prevents spray from being deposited on the wall surface of the combustion chamber, and ensures stable ignition, thereby allowing an effective stratified charge combustion to be performed.

In the direct injection engine of prior art, incidentally, stratified charge combustion is carried out by swirl air flow in a light load/low speed range, and the above-mentioned action takes place as a result. In a light load/high speed range, however, the piston traveling speed is increased by high speed rotation if swirl air flow remains in the combustion chamber. This makes it difficult to secure the time for spray fuel evaporation. As a result, the fuel injection time must be advanced. However, if the fuel injection time is advanced, fuel spray angle will increase due to low pressure in the combustion chamber, and spray fuel will be deposited on the inner surface of the cylinder head. This problem will cause another problem in stratified charge combustion operation in a light load/high speed range.

To solve such problems in the direct injection engine of prior art, stratified charge combustion is performed by swirl air flow in a light load/low speed range. Intake stroke injection is carried out in a heavy load/high speed range. At the same time, fuel is diffused through control of swirl ratio to provide uniform combustion. In a heavy load/high speed range, however, the sprayed fuel will be deposited on the top surface of the piston if fuel is diffused through control of swirl ratio to provide uniform combustion. This will make mixture with air difficult, and evaporation of spray fuel deposited thereon will be delayed. Fuel will tend to be discharged from the engine together with exhaust gas, without being burnt.

This results in increased amount of the unburnt hydrocarbon (THC) contained in exhaust gas discharged from the engine, causing environmental issues. At the same time, it will deteriorate engine performance and fuel economy.

The present invention has been made to solve these problems. Its object is to provide a direct injection engine capable of direct injection of fuel into the combustion chamber characterized in that discharge of gas containing hazardous gas component such as THC can be reduced and fuel economy can be improved by stratified charge combustion in the operation range of low to high speeds.

DISCLOSURE OF THE INVENTION

To achieve the above object, the direct injection engine according to the present invention is essentially characterized in that a tumble air flow is produced between the ignition plug located on the top of the combustion chamber and the fuel injector located on the side of the combustion chamber, and spray fuel is carried from the fuel injector to the ignition plug by this tumble air flow.

The direct injection engine as another embodiment of according to the present invention comprises an ignition plug arranged in the vertical axis direction of the cylinder, a fuel injector located on the axis line inclined with respect to t e horizontal axis perpendicular to the axis center of the cylinder, and an intake air control means. The intake air control means generates a tumble air flow in the combustion chamber, and the fuel injector discharges fuel from the intake air side in the combustion chamber toward the exhaust side. The ignition plug and the fuel injector are arranged in such a way that an angle β formed by a virtual straight line connecting between the ignition plug electrode and fuel injection point of the fuel injector and a horizontal axis line (X), and an spray top end angle γ (elevation angle) formed between the spray outer edge of spray fuel and horizontal axis line are within the range γ=β±5 deg. As a fuel injector, the one equipped with a swirl-generating element upstream from the valve body is suitably used.

The penetration of spray fuel is preferred to be longer on the ignition plug side than on the piston side.

To achieve the above-mentioned object, the present invention is designed in such a way that the fuel spray injected from the fuel injector is carried to the ignition plug by the tumble air flow which reaches the plug after rising from below the fuel injector along the wall surface of the intake air side in the combustion chamber (called tumble guide method).

To put it more specifically, the fuel injector is designed to ensure that fuel is injected 3.15 msec. before ignition timing of the ignition plug. The fuel injector is also configured so that fuel is injected at 80 deg. before top dead point when mean effective pressure in the combustion chamber is 350 KPa at the engine speed of 3200 rpm.

The direct injection engine according to the present invention designed to have the above-mentioned configuration reduces the amount of fuel deposited on the top surface of the piston and inner wall of the cylinder block, and improves ignition property of the ignition plug.

In other words, spray fuel is carried by tumble air flow over a short distance from the fuel injector to the ignition plug on the side of the cylinder. This reduces the amount of spray fuel deposited on the top surface of the piston and inner wall of the cylinder block. It also increases spray fuel density close to the ignition plug, thereby improving ignition property by the ignition plug.

As a result, the direct injection engine according to the present invention allows stratified operations to be performed over an extensive range from the idling range to the high speed range. It also reduces the amount of spray fuel deposited on the upper surface of the piston and inner wall of the cylinder block. This, in turn, reduces the amount of THC contained in exhaust gas, improves the purification rate, and improves fuel economy.

BEST FORM OF EMBODIMENT OF THE INVENTION

Figure 1:
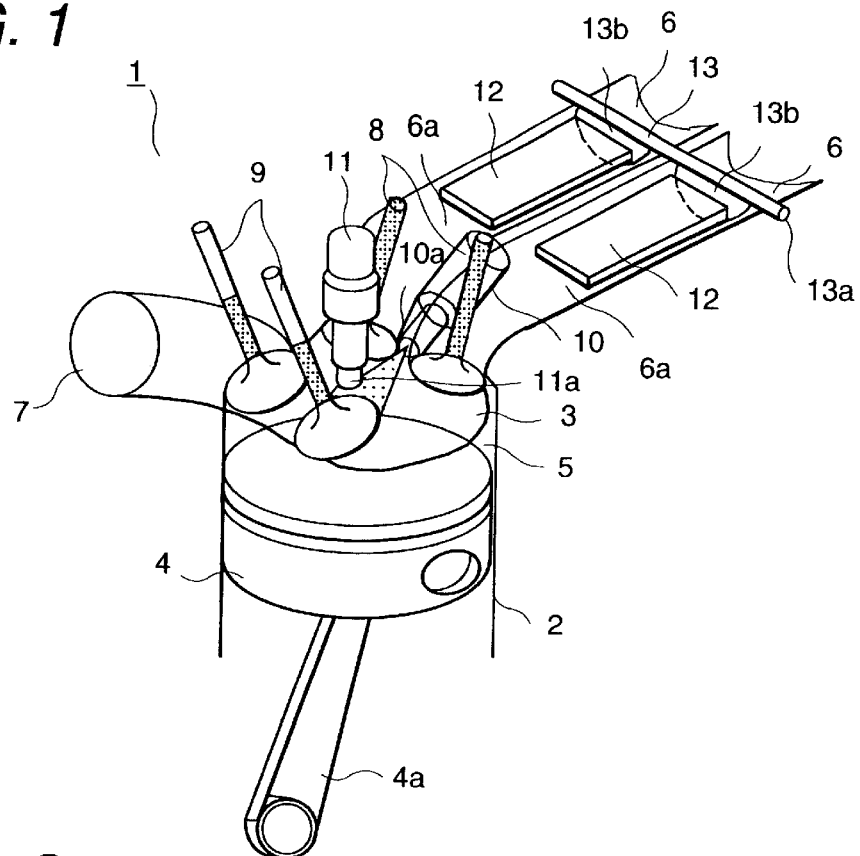
FIG. 1 is a perspective conceptual diagram representing one embodiment of a direct injection engine according to the present invention.

The following describes one embodiment of the direct injection engine according to the present invention with reference to drawings:

FIG. 1 is a perspective conceptual diagram representing a direct injection engine according to the present embodiment. A cylinder block 2 is mounted on the bottom of each cylinder of an engine body 1, and a cylinder head 3 is mounted on the top of the cylinder block 2.

A piston 4 having the top surface designed in an almost flat shape is provided inside the cylinder block 2 slidably in the vertical direction, and the space between the cylinder block 2 and the piston 4 is formed as a combustion chamber 5. The cylinder head 3 is designed as a pent roof, and the cylinder head 3 is connected with two intake manifolds 6 and 6 opening into the combustion chamber 5, and two exhaust pipes 7 and 7. Intake valves 8 and 8 are respectively arranged on intake manifolds 6 and 6 at the connection with the cylinder head 5, and exhaust valves 9 and 9 are respectively arranged on the exhaust pipes 7 and 7.

A fuel injector 10 for injecting fuel directly into the engine cylinder is installed between two intake valves 6 and 6 of the cylinder head 5, with its injection nozzle (injection point) 10a facing the combustion chamber 5. The fuel injector 10 is a high pressure swirling fuel injector designed to have such a shape that a conical form at the specified spray angle is obtained by giving a swirling force to the spray fuel. The fuel spray angle of the injected spray fuel tends to decrease with the increase in the pressure inside the combustion chamber 4. An ignition plug 11 is arranged at the central position on top of the cylinder head 5, with an electrode 11a forming an ignition gap facing the combustion chamber 5.

The intake valves 8 and 8 and exhaust valves 9 and 9 are moved in the vertical direction by the cam shaft (not illustrated) positioned on the top of cylinder head 3, thereby opening or closing the communicating valve holes between the intake manifolds 6 and 6 and exhaust pipes 7 and 7 formed on the cylinder head 3. Through a connecting rod 4a, the piston 4 is connected and interlocked with the crank shaft (not illustrated) which is shaft-supported rotatably on the bottom of the cylinder block 2. As the piston 4 is moved inside the cylinder block 2 in the vertical direction by the operation of the engine, the crank shaft is driven and rotated.

Two intake manifolds 6 and 6 upstream from intake valves 8 and 8 are provided with rectifier plates 12 and 12 for separating the intake flow path of intake manifolds 6 and 6 into top and bottom. Flow dividing valves 13 and 13 are arranged upstream from the rectifier plates 12 and 12. The flow dividing valves 13 and 13 comprise a valve shaft 13a and valve body 13b, and are arranged to ensure that the valve body 13b is moved within the range of 90 degrees from the position immediately below to the immediate side by rotating the valve shaft 13a. The flow dividing valves 13 and 13 are used to control the velocity and direction of air flow formed in the combustion chamber 4. When the air flow velocity is to be increased, the bottom flow paths 6a and 6a of the flow paths separated into two parts are blocked by the flow dividing valves 13 and 13. Then the area of the flow paths in the intake manifolds 6 and 6 is decreased, namely, a forward tumble air flow is formed in the combustion chamber 5. When the velocity of air flow formed in the combustion chamber 5 is not to be increased, or much air is to be sucked from the combustion chamber 5, the flow dividing valves 13 and 13 are opened, and the bottom flow paths 6a and 6a are released.

Figure 2:
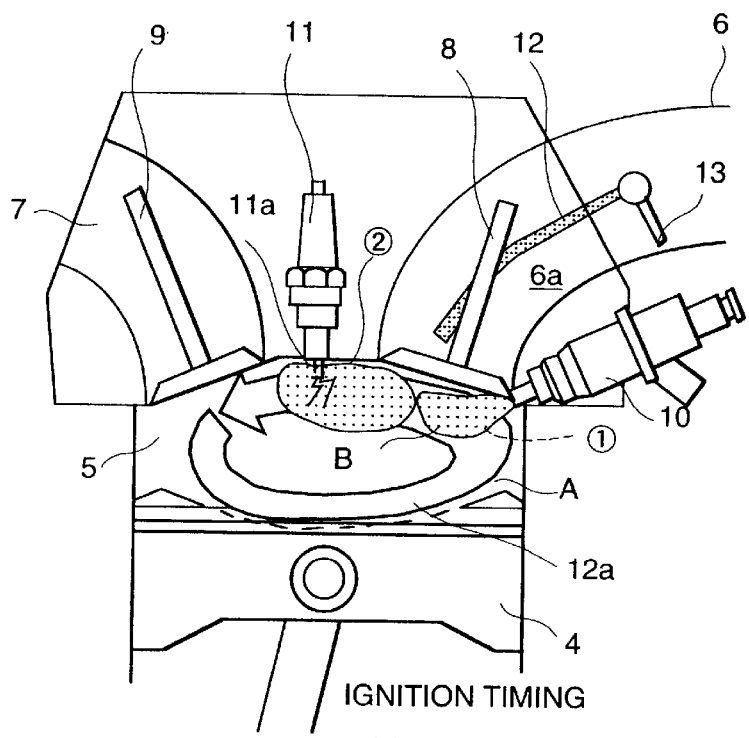
FIG. 2 is a drawing representing the status of the forward tumble air flow sucked into the combustion chamber of the direct injection engine of FIG. 1, and the status of fuel spray.

FIG. 2 shows the status of the tumble air flow sucked into the combustion chamber 5 of the direct injection engine of according to the present embodiment, and the status of fuel spray. When flow dividing valve 13 is closed and air flow is sucked into the combustion chamber 5 only from the top flow path 6b on the intake manifold 6, the state of forward tumble air flow shown by the arrow A occurs in the combustion chamber 5. This air flow moves on the top surface of the piston 4 and rises along the side surface (cylinder side surface) of the combustion chamber on the intake valve side. The fuel injected from the fuel injector 3 produces a deformed conical spray which is longer on the plug side and shorter on the piston side, as in the case of spray fuel B. The conical spray fuel B is carried by the tumble air flow to the ignition gap of the electrode 11a of ignition plug 11.

The tumble air flow A rises from the bottom of the spray fuel B, and spray fuel B is placed in the direction of the tumble air flow A. Spray fuel B is carried by the tumble air flow A moving from the fuel injector 10 to the ignition plug to reach the electrode 11a of the ignition plug 11. For example, when the engine speed is equivalent to 1400 rpm, the spray fuel reaches the electrode 11a of the ignition plug 11 3.15 msec after fuel is injected from the fuel injector 10.

(1) in FIG. 2 indicates that the fuel is injected prior to time of plug ignition.

(2) shows that fuel is carried to the plug by tumble air flow.

Under the condition of (2), ignition signal is just sent to the plug, and ignition timing is reached.

To put it more specifically, when mean effective pressure in the combustion chamber is 320 KPa (kilo-Pascal) at the engine speed of 1400 rpm, fuel is injected at 70 deg. before top dead point, and ignition timing is at 35 deg. before top dead point.

When mean effective pressure in the combustion chamber is 350 KPa at the engine speed of 3200 rpm, fuel is injected at 80 deg. before top dead point, and ignition timing is at 30 deg. before top dead point.

In both cases, fuel is injected about 3 msec. before ignition timing. This time has been measured in various operation ranges, and it has been revealed that injection of fuel 3.0 to 3.15 msec. before is satisfactory.

Figure 3:
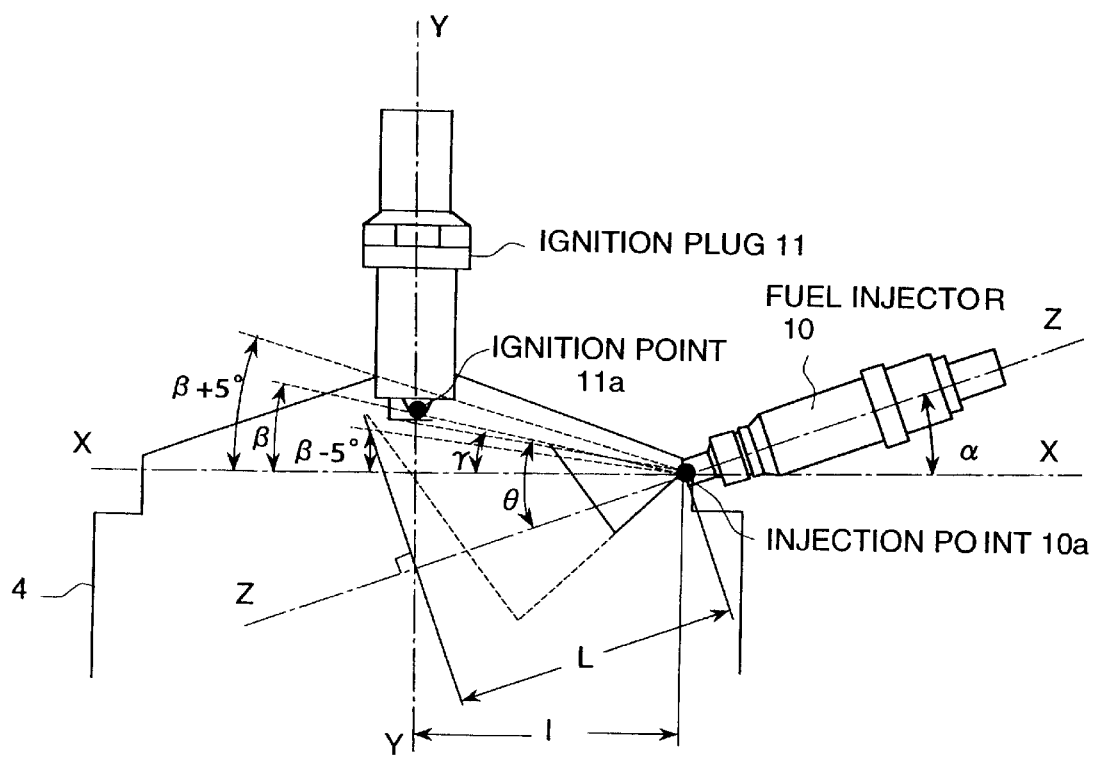
FIG. 3 is a drawing representing the positional relationship between the ignition plug and fuel injector of the direct injection engine of FIG. 1, spraying state of the fuel injector, and the positional relationship between the ignition gap and ignition plug electrode.

FIG. 3 shows the positional relationship between the ignition plug 11 and fuel injector 10 of the direct injection engine according to the present embodiment, and the positional relationship between the injection nozzle (injection point) 10a of the fuel injector 10 and the ignition gap (ignition point) of electrode 11a of ignition plug 11.

The ignition plug 11 is arranged in the vertical direction with its axis center Y in the longitudinal direction matching with that of the engine block 2. The fuel injector 10 is arranged with its axis center z inclined by angle (injector installation angle) α with respect to the axis line X at a right angle to the axis center Y and passing through the axis center Y, where the injection nozzle 10a of the fuel injector 10 is used as a reference point. The ignition gap (ignition point) of the electrode 11a of the ignition plug 11 is positioned at angle 62 with respect to the axis line X where the injection nozzle (injection point) 10a of the fuel injector 10 is used as a reference point. The ignition gap of the electrode 11a and the injection nozzle (injection point) 10a are located so that there is a positional distance l between them.

Spray injected from the fuel injector 10 has a deflected conical form, and is injected at a fuel spray angle θ (angle formed between the axis center Z of the fuel injector 10 and spray top edge). The angle formed between the axis line X and spray top edge is assumed as a spray top end angle γ, and the length of deflected conical spray is assumed as penetration (distance for spray arrival) L. spray is generated so that this penetration is longer than positional distance l.

Figure 4A:
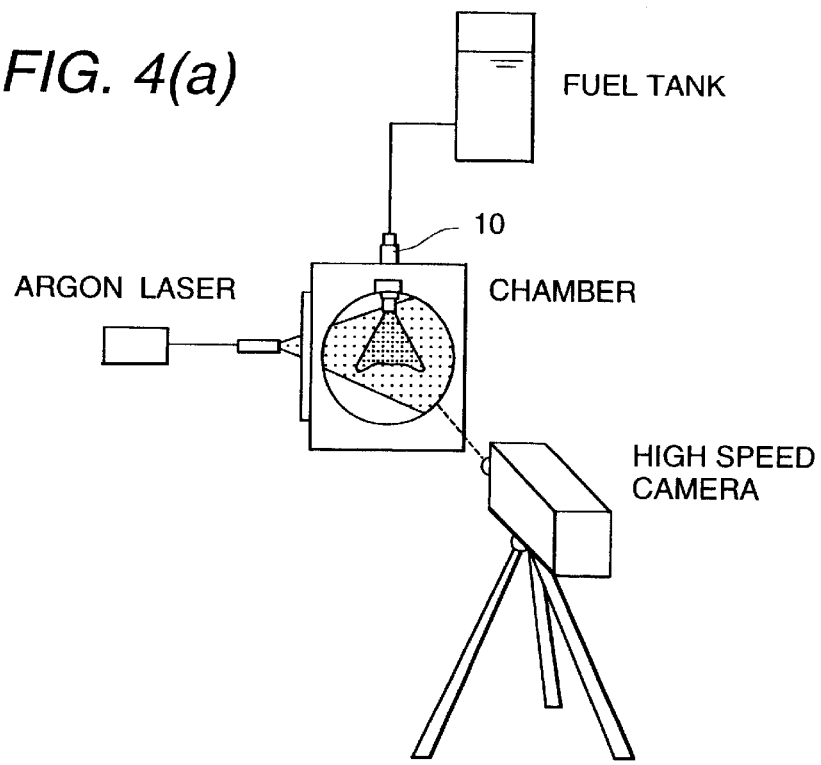
FIG. 4 is a drawing illustrating how to photograph spray fuel injected from the fuel injector and how to calculate the fuel spray angle $\theta$ and penetration length L from the photographed spray fuel image, wherein (a) shows the photographing method, and (b) illustrates the calculation method.
Figure 4B:
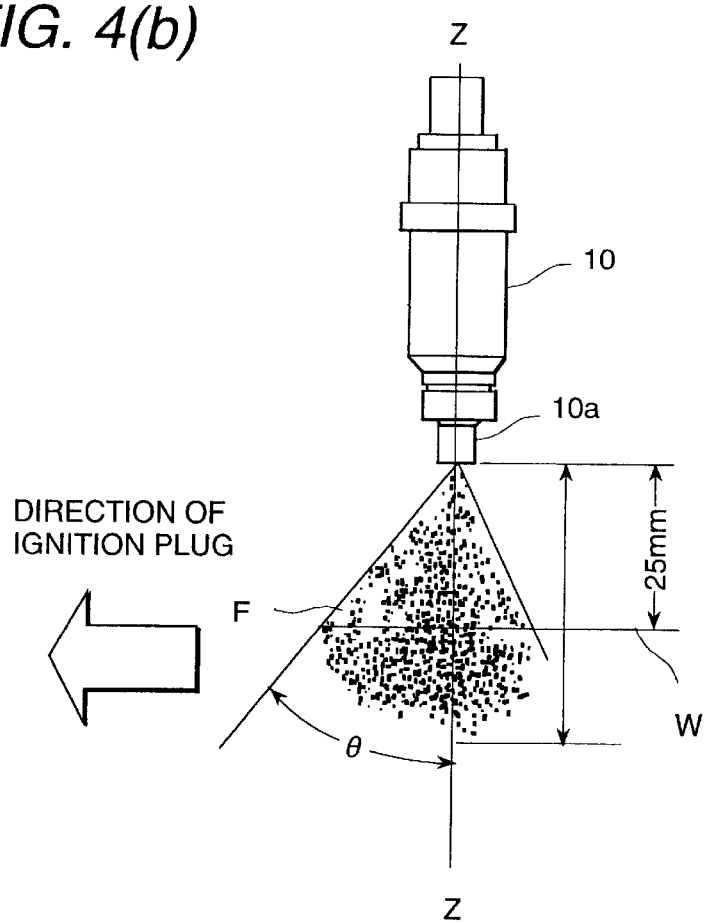

FIG. 4 illustrates how to photograph spray fuel injected from the fuel injector and how to calculate the fuel spray angle e and penetration length L of the photographed spray fuel image, wherein (a) shows the photographing method, and (b) illustrates the calculation method;

The following describes the method of photographing: A chamber allowing a specified pressure to be created therein, a fuel injector 10 for injecting fuel into this chamber and a high-speed camera are used in this case. Fuel from a fuel tank is injected (e. g. injection pulse width of lms) at a specified pressure (e.g. 7 MPa) from the fuel injector 10 into the chamber to which specified pressure (e.g. 0.6 MPa) is applied, and a conical spray fuel is formed. In the meantime, laser beam is applied into the chamber from argon laser. The state of conical spray fuel 3.6 msec. after injection is started from the fuel injector 10 is photographed by the high-speed camera to get a spray fuel image. The specified pressure of the fuel injected from the fuel injector 10 is equivalent to the pressure of fuel injected into the engine. The specified pressure in the chamber is equivalent to the pressure inside the cylinder when the fuel is injected into the cylinder of the engine. Photograph is taken without air flow in this chamber.

(b) shows how to calculate the fuel spray angle θ and penetration length L from the spray fuel image obtained from the photographing method given in (a). Measurement is made of the angle e formed between edge F of the conical spray fuel on the ignition plug side and axis center Z on the line W perpendicular to axis center Z 25 mm from the injection nozzle 10a of the fuel injector 10. Namely, fuel spray angle θ is measured. Furthermore, penetration length L is measured as a distance from the injection nozzle 10a of the fuel injector 10 to the tip in the direction of injection.

In this way, if the fuel spray angle θ of the fuel injector 10 is determined, angles α and 62 are predetermined by each cylinder, as shown in FIG. 3. So the spray top end angle γ can be determined from θ−α=γ.

Figure 5A:
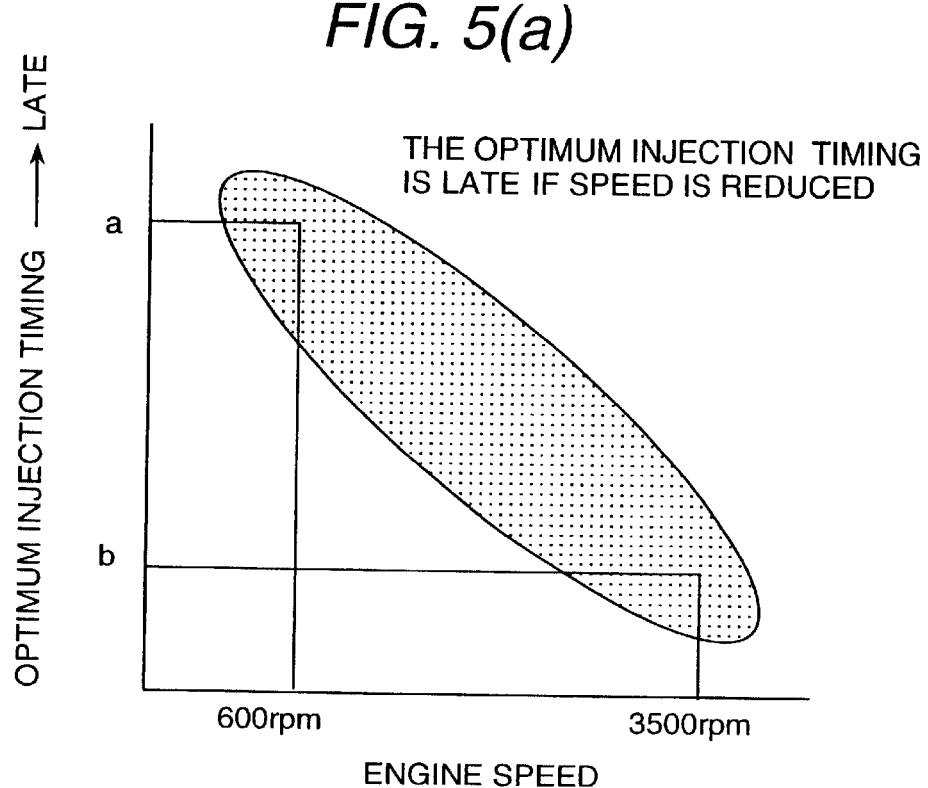
FIG. 5 is a drawing representing the relationship between changes in engine operation states (speed and cylinder internal pressure) and the optimum fuel injection time, wherein (a) shows the relationship between engine speed and optimum injection time, and (b) indicates the optimum injection time as viewed from the cylinder internal pressure and crank angle.
Figure 5B:
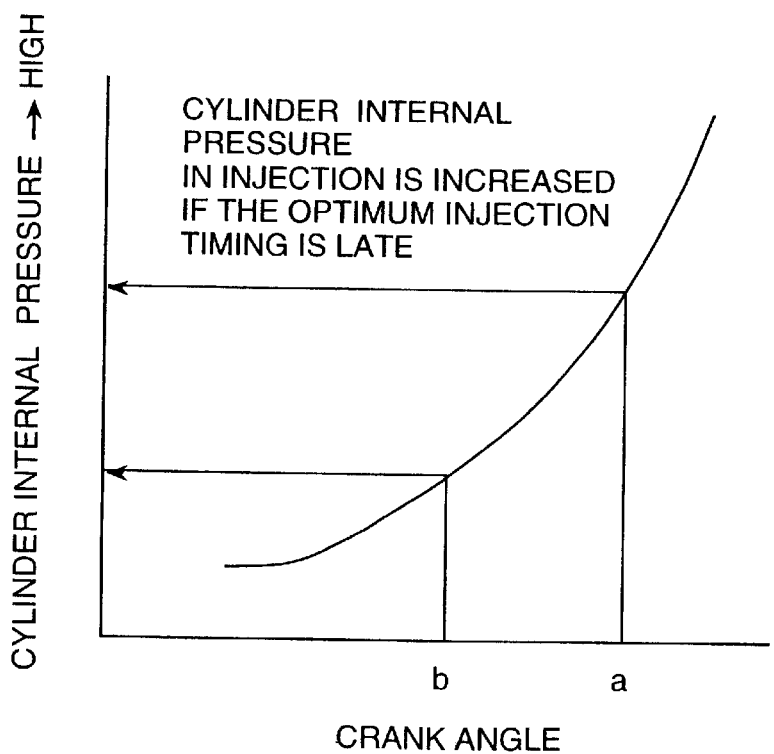

FIG. 5 represents the relationship between changes in engine operation states (speed and cylinder internal pressure) and the optimum fuel injection time, wherein (a) shows the relationship between engine speed and optimum injection time, and (b) indicates the optimum injection time as viewed from the cylinder internal pressure and crank angle. (a) indicates that the optimum injection time is delayed when the engine speed is high, and (b) shows that cylinder internal pressure is high when the crank angle at the optimum time for fuel injection is delayed, while the pressure is low when the crank angle at the optimum time for fuel injection is advanced.

Furthermore, the spray angle and penetration (spray length) of the fuel sprayed from the general fuel injector depend on the cylinder internal pressure. The higher the cylinder internal pressure, the smaller the spray angle and penetration. This suggests that the preferred fuel injector to cope with various states is the one capable of spraying without being affected by the changes in cylinder internal pressure. To put it more specifically, such preferred valves include those capable of (1) solid spraying in conical form where fuel including the inner portion is sprayed, (2) spraying in porous conical form, or (3) powerful spraying in the direction of the electrode of ignition plug 11.

Figure 6:
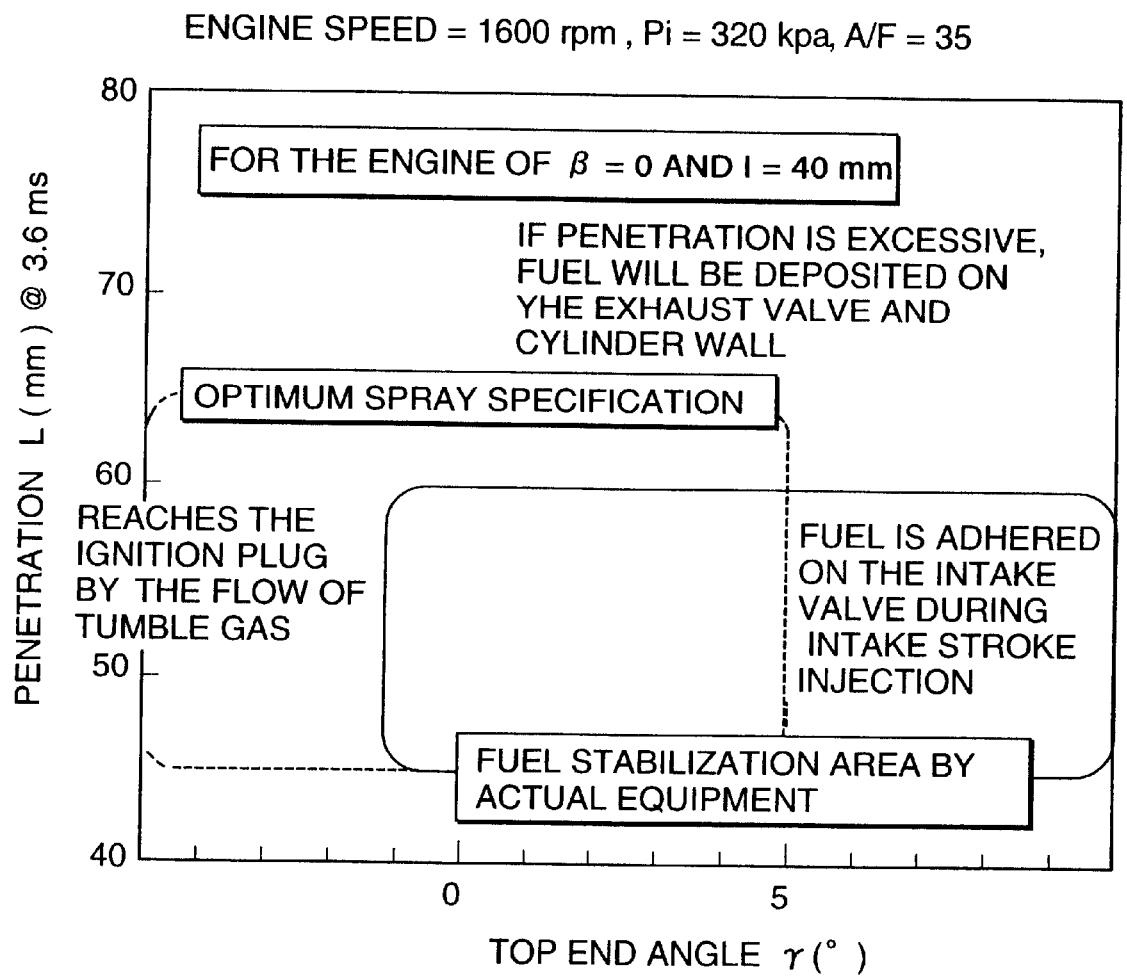
FIG. 6 is a drawing representing how the optimum form of spray condition (specifications) is derived from the relationship between the fuel top end angle $\gamma$ and penetration length L through experiment and simulation using the direct injection engine of FIG. 3.

FIG. 6 represents how the optimum form of fuel spray condition (specifications) is derived from the relationship between spray top end angle γ and penetration length L through experiment and simulation using the direct injection engine where the relationship between the ignition plug 11 and the fuel injector 10 is as given in FIG. 3.

In experiment and simulation, use was made of a direct injection engine wherein the angle β formed between the ignition gap (ignition point) of the electrode 11a of the ignition plug 11 and the injection nozzle (injection point) 10a of the fuel injector 10 was 0, and the distance l between the ignition gap of the electrode 11a and the injection nozzle (injection point) 10a was 40 mm. Operation was performed at an engine speed of 1600 mm, cylinder internal pressure Pi of 320 kPa and air/fuel ratio A/F of 35, with tumble air flow in the combustion chamber 5 for this experiment and simulation.

According to the result of the experiment using an actual apparatus, the stable combustion area can be ensured when the spray top end angle γ is in the range from −1 to 10 deg. According to the result of simulation, however, fuel may be deposited on the intake valve during injection in the intake stroke if the spray top end angle γ is 5 deg. or more. In the case of experiment using an actual apparatus, the combustion area is outside the stable area if the spray top end angle γ is −1 deg. In simulation, spray fuel can be raised to the ignition plug 11 to reach the spark gap of the electrode 11a of the ignition plug 11 by generating a tumble air flow in the cylinder in an appropriate state. So the range of the spray top end angle γ of up to about −5 can be set as the optimum fuel spray condition (specification). Furthermore, in simulation, fuel is anticipated to deposit on the inner wall of the exhaust valve cylinder when the penetration length L is 64 mm or more. So the optimum fuel spray condition (specification) is reached the penetration length L is below 64 mm. Furthermore, if there is no tumble air flow, the penetration length L is required to be greater than the distance 1 of 40 mm between the spark gap 11 of the electrode and injection nozzle. According to the result of simulation, penetration length L should be about 45 mm or more under the optimum fuel spray condition.

When consideration is given to the fuel carried by the tumble air flow, the excess amount of fuel will pass by the plug at the time of ignition if the conditions are better.

In other words, according to the result of experiment and simulation, the spray top end angle γ in the optimum fuel spray condition is required to be within the range of β±5 (where β denotes an angular position of the spark gap (ignition point) of the electrode of the ignition plug when the injection nozzle of the fuel injector is used as a reference point), when operation is performed with tumble air flow in the combustion chamber of the direct injection engine. In this case, it is also required that penetration length L of spray fuel be greater than the distance l of 40 mm between the spark gap of the electrode and injection nozzle (injection point). The approximate penetration length L should be within the range from 40 to 45 mm.

In the measurement of FIG. 4, it is possible to check from γ=±5 to see if the specific spray top end angle γ is under the optimum fuel spray conditions or not, if the spray top end angle γ of the specific fuel injector is determined.

Figure 7A:
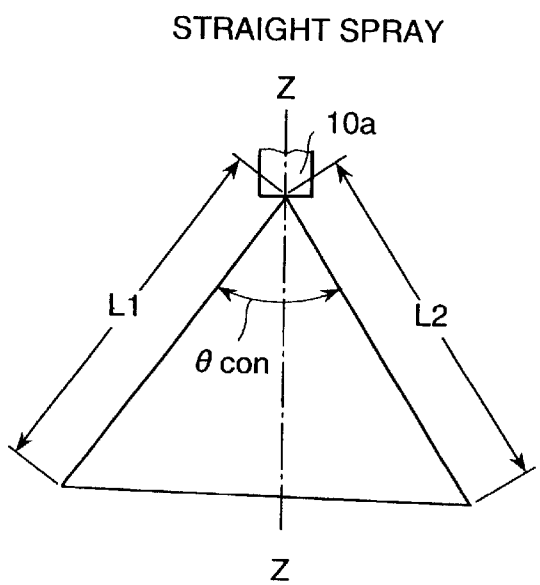
FIG. 7 is a drawing representing the form of spraying from multiple fuel injectors, different from that of spraying of prior art, wherein (a) shows straight spraying, (b) straight spraying with deviated density and (c) deviated spraying.
Figure 7B:
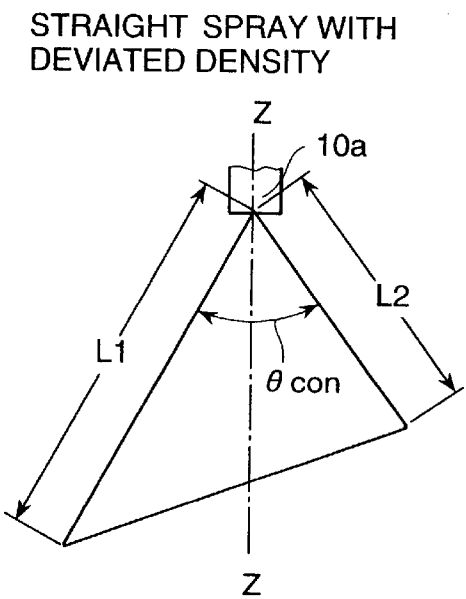
Figure 7C:
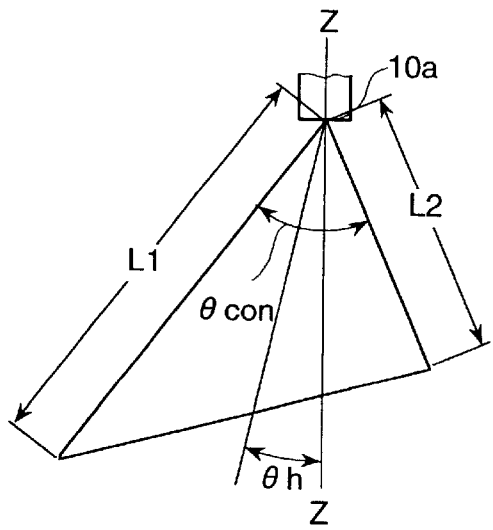

FIG. 7 represents the form of spraying from multiple fuel injectors, different from that of commonly used spraying mode, wherein (a) shows straight spraying, (b) straight spraying with deviated density and (c) deviated spraying. It shows the state of spraying at a conical spray angle θ. In (a) straight spraying, fuel is sprayed to an object in a conical form with the axis center Z of the fuel injector as a center. In (b) straight spraying with deviated density, fuel is sprayed to an object in a conical form with the axis center Z of the fuel injector as a center, but spraying length is not symmetrical. In (c) deviated spraying, fuel is sprayed unsymmetrically in a conical form with the axis center Z of the fuel injector as a center. Spraying length is not symmetrical, either.

From the layout relationship between the ignition plug 11 and the fuel injector 10 shown in FIG. 2, in other words, relationship between α and β it can be appreciated that, as the ignition point of the ignition plug 11 is higher (as the angle β is greater) or more fuel is injected from the fuel injector 10 down to the cylinder block 2 (as the angle β is greater), the fuel injector is required to inject fuel at a wider angle (greater conical spray angle θcon) in order to satisfy γ=β±5. If fuel at a wider angle is injected, spray fuel per unit volume is less dense, so fuel at the ignition point of ignition plug 11 is anticipated as less dense. Thus, use of a fuel injector of deviated spraying is more effective when relationship between angles α and β, namely, α+β is greater. Conversely, if α+β is smaller, a fuel injector of straight spraying can be used.

Accordingly, when conical spray angle in various spraying modes (a) to (c) of FIG. 7 is θcon, use of (c) deviated spraying is effective in the case of θcon/2>40 deg., wherein spraying of partially different density is provided. When θcon/2≦40 deg., use of a fuel injector of each spraying mode in (a) to (c) is preferred.

Figure 8A:
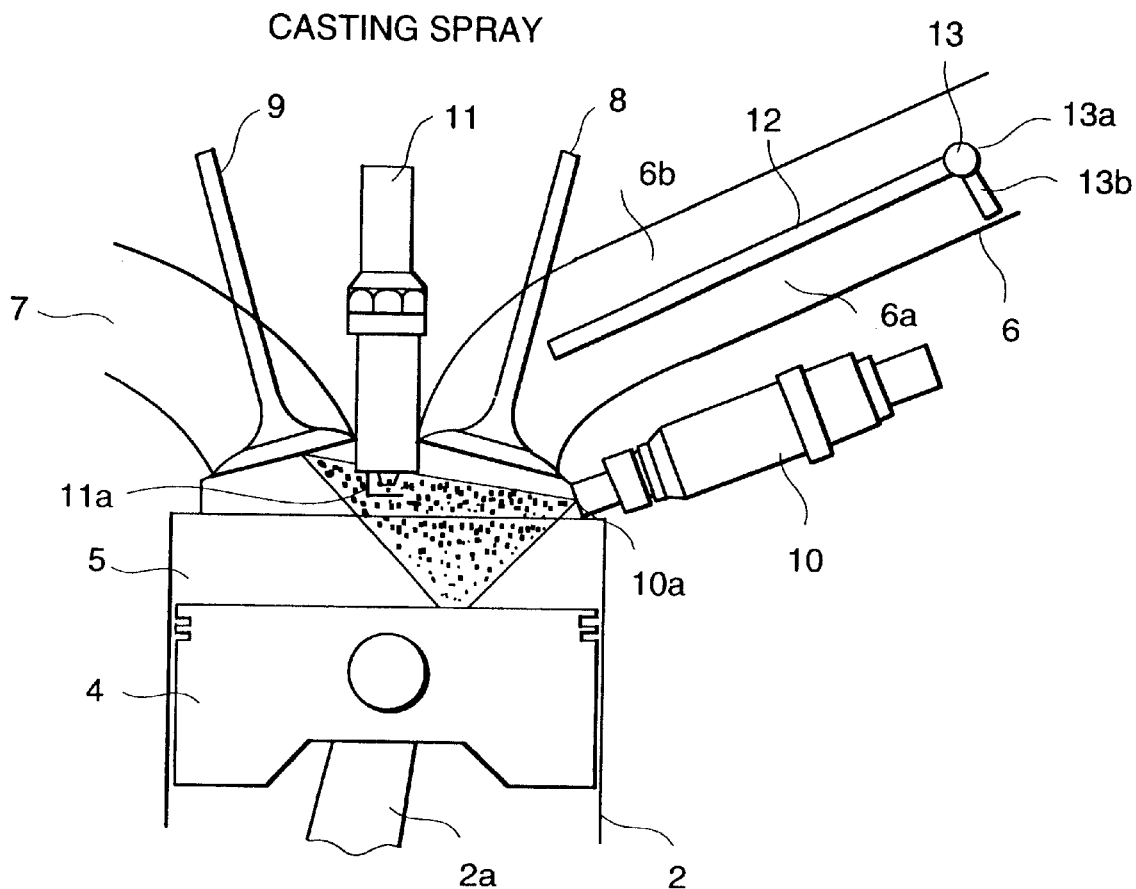
FIG. 8 is a drawing showing the direct injection engine of FIG. 1 equipped with a fuel injector of deviated spraying mode where deviation is found in distribution of fuel spraying density.
Figure 8B:
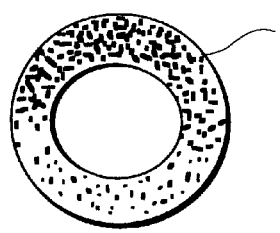
Figure 9A:
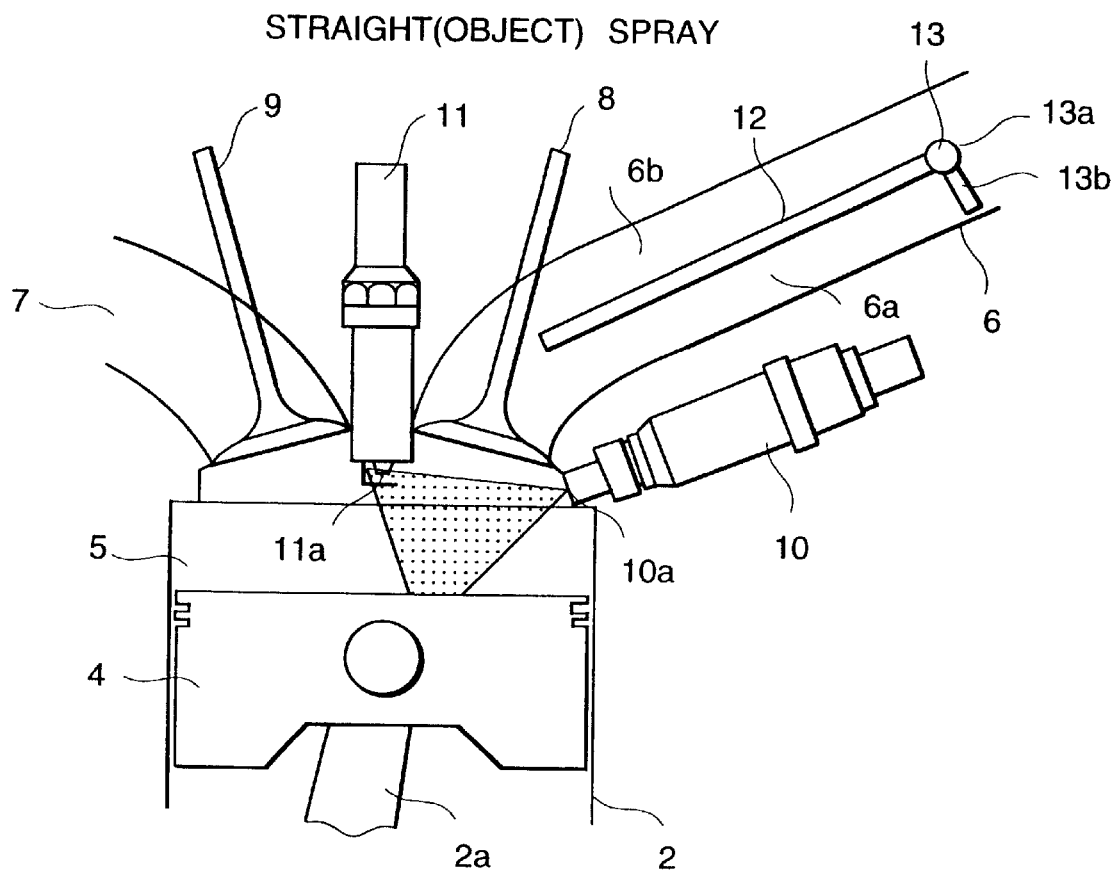
FIG. 9 is a drawing showing the direct injection engine of FIG. 1 equipped with a fuel injector of straight (symmetrical) spraying mode where distribution of fuel spray density is uniform on the circumference.
Figure 9B:
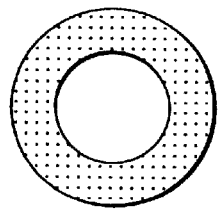

FIGS. 8 and 9 show spraying in the case of direct injection engines equipped with the fuel injectors characterized by different fuel spraying modes. FIG. 8 represents a direct injection engine equipped with a fuel injector of deviated spraying mode where deviation is found in distribution of fuel spraying density. FIG. 9 represents a direct injection engine equipped with a fuel injector of straight (symmetrical) spraying mode where distribution of fuel spray density is uniform on the circumference.

In the deviated spraying mode of FIG. 8, spray density is high in the direction of the ignition plug, so denser fuel is likely to be injected to the position around the gap of the electrode of the ignition plug. In the straight (symmetrical) spraying mode shown in FIG. 9, denser fuel is not spread around the gap of the electrode of the ignition plug. Since the density of fuel sprayed toward the piston is higher than that in deviated spraying mode, fuel tends to deposit on the top surface of the piston. This may lead to an increase in the amount of HC contained in the exhaust gas.

From this, it is apparent that the fuel injector of deviated spraying mode is basically preferred when used in the direct injection engine according to the present embodiment.

Figure 10A:
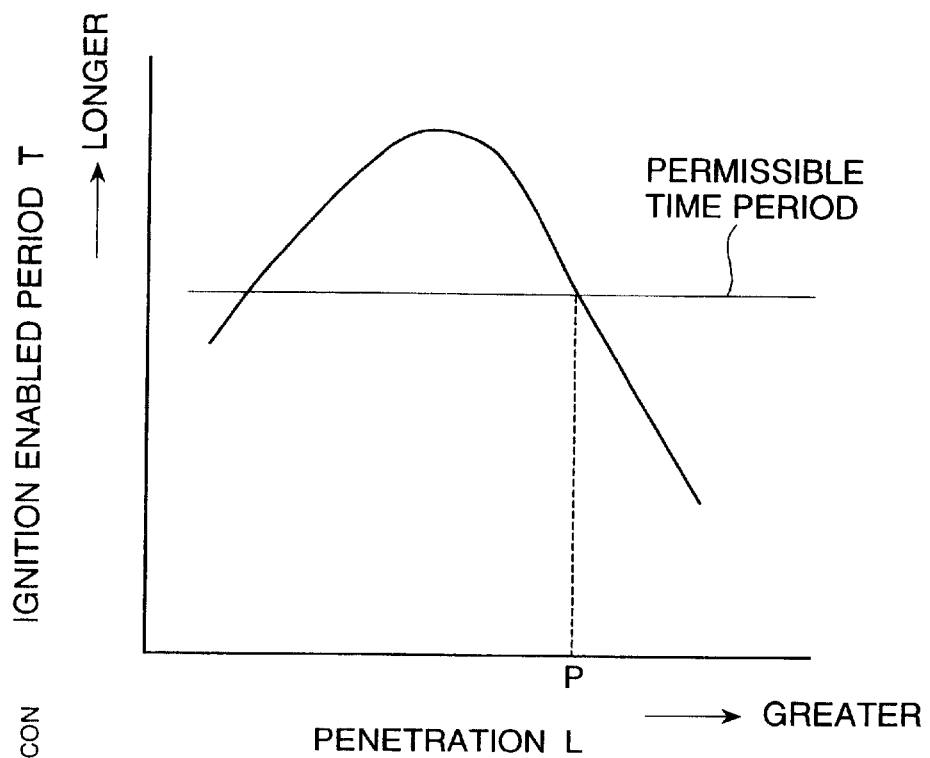
FIG. 10 is a drawing showing the relationship between ignition-enabled time T and conical fuel spray angle $\theta$con with respect to penetration length L of spray fuel, wherein (a) shows the relationship between penetration length L and ignition-enabled time T, and (b) depicts the relationship between penetration length L and conical fuel spray angle $\theta$con.
Figure 10B:
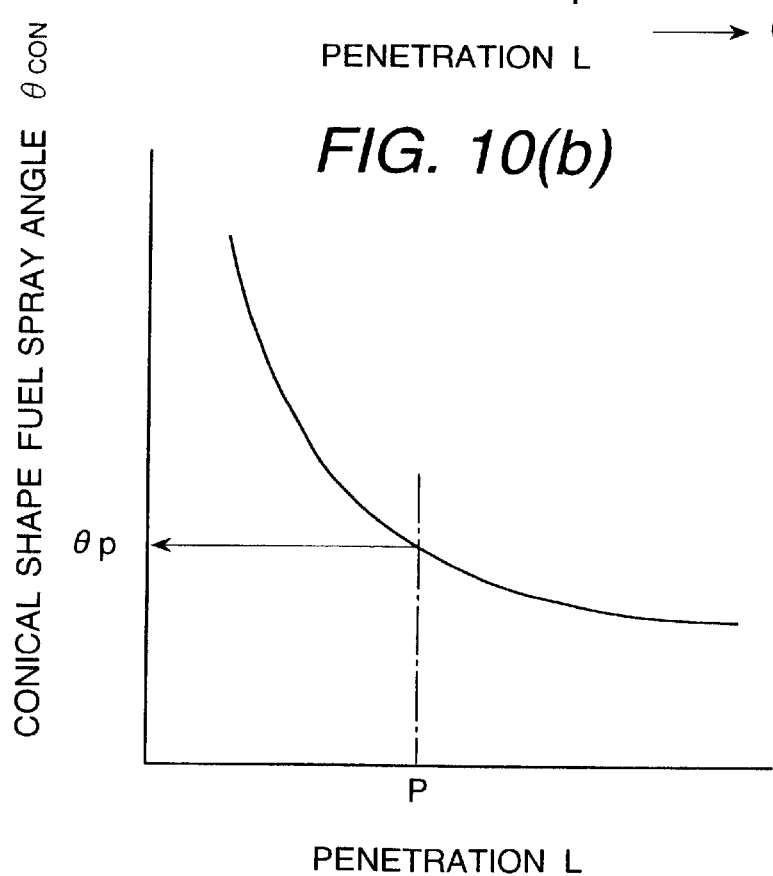

FIG. 10 represents the relationship between ignition-enabled time T and conical fuel spray angle θcon with respect to penetration length L of spray fuel, wherein (a) shows the relationship between penetration length L and ignition-enabled time T, and (b) depicts the relationship between penetration length L and conical fuel spray angle θcon.

Penetration length L is limited in its permissible length. When the critical length P is exceeded, there will be no ignition-enabled time and ignition failure may occur. Penetration length L is inversely proportional to conical fuel spray angle θcon. If penetration length L is greater, fuel spray angle θcon. must be reduced. Conversely, if penetration length L is smaller, conical fuel spray angle θcon must be increased. Furthermore, since the penetration length L has a critical length P in relation to ignition-enabled time, it is subjected to the restriction of conical fuel spray angle θcon due to critical length P. The fuel spray angle θcon smaller than conical fuel spray angle θp con corresponding to critical length P is not suited to use in the direct injection engine according to the present embodiment.

Figure 11:
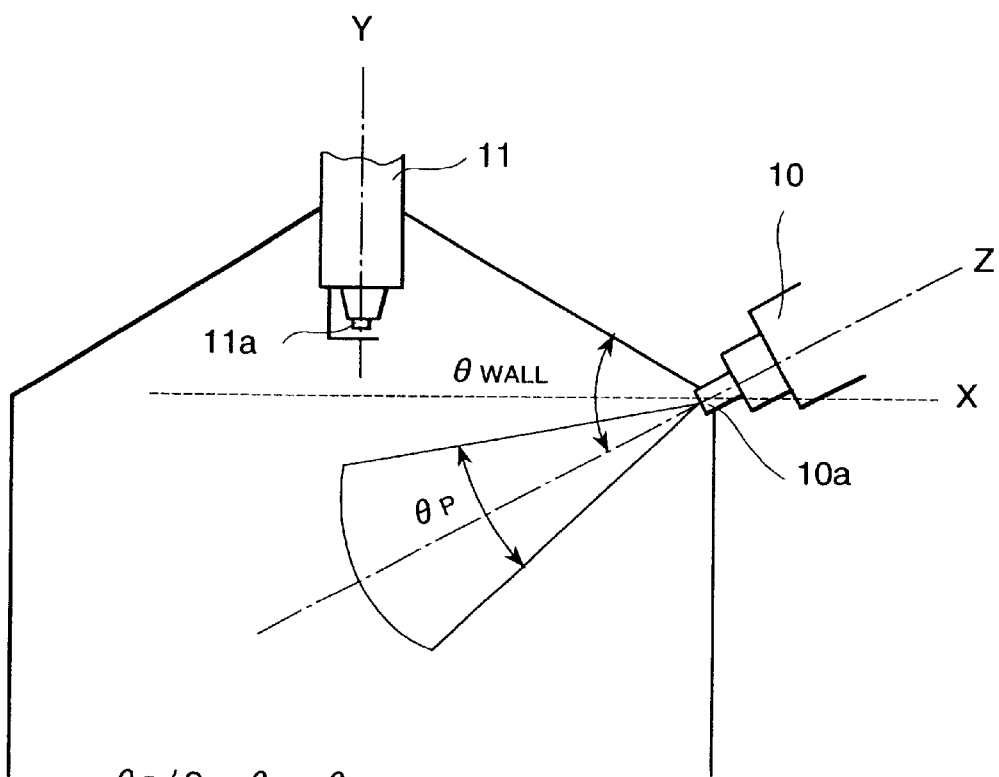
FIG. 11 is a drawing representing the direct injection engine equipped with the fuel injector for spraying fuel at conical fuel spray angle $\theta$p where the inner wall angle of the engine head is $\theta$wall.

FIG. 11 represents the direct injection engine equipped with the fuel injector 10 for spraying fuel at conical fuel spray angle θp where the inner wall angle of the engine head is θwall. It illustrates how to set the fuel spray angle θ with respect to the conical fuel spray angle θp and the inner wall angle of the engine head is θwall.

When the fuel spray angle θ is smaller than θ/2, the ignition time is too short, and ignition error is likely to occur. At the same time, when fuel spray angle θ is greater than θwall, spray fuel may deposit on the inner wall of the engine head. This may lead to the fuel being discharged as unburnt hydrocarbon (HC) together with exhaust gas.

For this reason, fuel spray angle θ must be set within the range from θp/2<θ<θwall.

The above describes one embodiment of the present invention. The present invention is not restricted to this embodiment. Various designing modifications are possible without departing from the spirit of the invention described in WHAT IS CLAIMED.

Applicability in Industry

As can be seen from the above description, the direct injection engine according to the present invention is characterized in that spray fuel is received by air flow due to tumble flow and is shifted to the ignition plug on the side of the cylinder head. This reduces the amount of fuel deposited on the upper surface of the piston and inner wall of the cylinder block. It also increases the density of the spray fuel close to the ignition plug, thereby improving the ignition by ignition plug.

The direct injection engine according to the present invention allows stratified operations to be performed over an extensive range from the idling range to the high speed range. It also reduces the amount of spray fuel deposited on the upper surface of the piston and inner wall of the cylinder block. This, in turn, reduces the amount of THC contained in exhaust gas, and improves the purification rate and fuel economy.

What is claimed is:

1. A direct injection engine comprising:
a cylinder head having a conically-shaped face,
an ignition plug arranged on the top of a combustion chamber, positioned at an apex point of the conically-shaped face, and installed at a substantial center of the cylinder head,
a fuel injector located on a side of said combustion chamber and installed in a vicinity of an intersection point between the cylinder head and a cylinder block, and
an intake air control means installed on an intake manifold,
wherein said intake air control means generates a tumble air flow rising from the bottom of said fuel injector to said ignition plug in said combustion chamber,
wherein said fuel injector is configured to inject fuel spray from the intake side in said combustion chamber to the exhaust side, thereby supplying said fuel spray between said ignition plug and said tumble air flow,
wherein, with respect to a line which passes through an injection point of the fuel injector and intersects at a substantially right angle with a center line of a cylinder, the fuel injector is installed so as to be inclined along a central axial line of the fuel injector toward the piston side, and
wherein, when the fuel spray injected from the fuel injector is sectionally crossed with a plane which includes a spark point of the ignition plug and the injection point of the fuel injector, the ignition plug is positioned between the line which passes through the injection point and the face of the cylinder head.

2. The direct injection engine according to claim 1,
wherein the ignition plug is arranged along the vertical axis center of the cylinder,
wherein the central axial line is inclined with respect to the line which passes through the injection point,
wherein said ignition plug and said fuel injector are arranged in such a way that an angle β formed by a virtual straight line connecting between the spark point of said ignition plug and the injection point of said fuel injector and said line which passes through the injection point, and
wherein a spray top end angle γ formed between a spray outer edge of said fuel spray and said line which passes through the injection point are within the range of γ=β+5 deg.

3. The direct injection engine according to claim 1, wherein said fuel injector has a swirl generating element.

4. The direct injection engine according to claim 1, wherein said fuel injector has a penetration which is long in the direction of said ignition plug and short in the direction of a piston.

5. The direct injection engine according to claim 1, wherein a distance for arrival of said fuel spray is set greater than a layout distance between the injection point of said fuel injector and the spark point of said ignition plug.

6. The direct injection engine according to claim 5, wherein said distance for arrival of the fuel spray is within the range from about 1.125 to 1.6 times the layout distance.

7. The direct injection engine according to claim 1 wherein a fuel spray angle θ of the fuel spray is set within θp/2<θ<θwall in a relationship between fuel injection angle θp of a permissible critical distance during ignition-enabled time regarding a distance for arrival of spray fuel and a face angle θwall of the cylinder head.

8. The direct injection engine according to claim 1 wherein said fuel injector is arranged to ensure that spray density distribution is deviated and a portion of higher density is sprayed to the spark point of said ignition plug.

9. The direct injection engine according to claim 8, wherein the fuel spray is sprayed in a conical form and at a conical spray angle θcon, and wherein said conical spray angle is within the range of θcon/2>40 deg.

10. A combustion method for a direct injection engine including a cylinder head having a conically-shaped face, an ignition plug arranged on the top of a combustion chamber, positioned at an apex point of the conically-shaped face, and installed at a substantial center of the cylinder head, a fuel injector located on a side of said i combustion chamber and installed in a vicinity of an intersection point between the cylinder head and a cylinder block, and an intake air control means installed on an intake manifold, the method comprising:

generating a tumble air flow rising from the bottom of said fuel injector to said ignition plug in said combustion chamber with said intake air control means, and causing fuel spray injected from said fuel injector to rise from the bottom of said fuel injector along a wall surface on an intake air side in said combustion chamber and to be carried by said tumble air flow from said fuel injector to said ignition plug so that said fuel spray reaches said ignition plug by the time of ignition of said ignition plug, wherein, with respect to a line which passes through an injection point of the fuel injector and intersects at a substantially right angle with a center line of a cylinder, the fuel injector is installed so as to be inclined along a central axial line of the fuel injector toward the piston side, and wherein, when the fuel spray injected from the fuel injector is sectionally crossed with a plane which includes a spark point of the ignition plug and the injection point of the fuel injector, the ignition plug is positioned between the line which passes through the injection point and the face of the cylinder head.

11. The combustion method for a direct injection engine according to claim 10, wherein said fuel injector is designed to spray fuel 3 msec. before the time of ignition of the ignition plug.

12. The combustion method for a direct injection engine according to claim 10, wherein said fuel injector is designed to inject fuel at 80 deg. before top dead point when mean effective pressure in the combustion chamber is 350 KPa at the an engine speed of 3200 rpm.

13. The combustion method for a direct injection engine according to claim 10, wherein the ignition plug is arranged along the vertical axis center of the cylinder, wherein the central axial line is inclined with respect to the line which passes through the injection point, wherein said ignition plug and said fuel injector are arranged in such a way that an angle $\beta$ formed by a virtual straight line connecting between the spark point of said ignition plug and the injection point of said fuel injector and said line which passes through the injection point, and wherein a spray top end angle $\gamma$ formed between a spray outer edge of said fuel spray and said line which passes through the injection point are within the range of $\gamma=\beta\pm5$ deg.

* * * * *